(12) United States Patent
Forstmeier et al.

(10) Patent No.: US 9,279,264 B2
(45) Date of Patent: Mar. 8, 2016

(54) METHOD AND ARRANGEMENT FOR A WATER TREATMENT

(71) Applicant: Evoqua Water Technologies GmbH, Gunzburg (DE)

(72) Inventors: Dieter Forstmeier, Burgau (DE); Cosima Sichel, Karlsruhe (DE); Johannes Stein, Ulm (DE)

(73) Assignee: Evoqua Water Technologies GmbH, Günzburg (DE)

( * ) Notice: Subject to any disclaimer, the term of this patent is extended or adjusted under 35 U.S.C. 154(b) by 368 days.

(21) Appl. No.: 13/688,403

(22) Filed: Nov. 29, 2012

(65) Prior Publication Data

US 2013/0134104 A1 May 30, 2013

(30) Foreign Application Priority Data

Nov. 29, 2011 (EP) .................... 11191164

(51) Int. Cl.
*E04H 4/12* (2006.01)
*C02F 1/68* (2006.01)
(Continued)

(52) U.S. Cl.
CPC .............. *E04H 4/1209* (2013.01); *C02F 1/008* (2013.01); *C02F 1/68* (2013.01); *C02F 1/76* (2013.01); *C02F 1/32* (2013.01); *C02F 1/66* (2013.01); *C02F 2101/12* (2013.01); *C02F 2101/36* (2013.01); *C02F 2103/42* (2013.01);
(Continued)

(58) Field of Classification Search
CPC .............. C02F 1/68; C02F 1/76; C02F 1/008; C02F 1/32; C02F 1/66; C02F 2101/12; C02F 2101/36; C02F 2103/42; C02F 2301/043; C02F 2301/046; C02F 2303/04; C02F 2303/185; C02F 2209/001; C02F 2209/003; C02F 2209/006; C02F 2209/29; C02F 2209/40; C02F 2209/44; E04H 4/1209; E04H 4/1281

See application file for complete search history.

(56) References Cited

U.S. PATENT DOCUMENTS 4,673,513 A 6/1987 Powell, Jr. .................... 210/756
5,614,528 A * 3/1997 Jones et al. ................ 514/262.1

(Continued)

FOREIGN PATENT DOCUMENTS

EP 0857694 A2 8/1998 ............. A01N 59/00
WO 99/33752 A1 7/1999 ................ C02F 1/32
WO 2007/079749 A1 7/2007 ................ C02F 1/32

OTHER PUBLICATIONS

Gardiner, J., "Chloroisocyanurates in the Treatment of Swimming Pool Water," Water Research, vol. 7, Pergamon Press, 11 pages, Sep. 28, 1972.

(Continued)

*Primary Examiner* — Lucas Stelling

(57) ABSTRACT

In a method for water treatment by chlorine disinfection, a chlorine stabilizer is dosed into water to be treated as far as a predetermined chlorine stabilizer concentration in said water is achieved. As soon as the predetermined chlorine stabilizer concentration is achieved said achieved chlorine stabilizer concentration is maintained in said water constant. A chlorine disinfectant concentration is adjusted in said water to be treated to a predetermined chlorine disinfectant concentration in said water by dosing a non-stabilized chlorine disinfectant (free chlorine) into said water to be treated. Therefore advantages of free chlorine and stabilized chlorine disinfection and facilitating to reduce DBPs at low chlorine stabilizer concentrations in water can be combined, without compromising disinfection safety.

16 Claims, 3 Drawing Sheets

(51) Int. Cl.
*C02F 1/76* (2006.01)
*C02F 1/32* (2006.01)
*C02F 1/00* (2006.01)
C02F 1/66 (2006.01)
C02F 101/12 (2006.01)
C02F 101/36 (2006.01)
C02F 103/42 (2006.01)

(52) U.S. Cl.
CPC ..... *C02F2209/001* (2013.01); *C02F 2209/003* (2013.01); *C02F 2209/006* (2013.01); *C02F 2209/29* (2013.01); *C02F 2209/40* (2013.01); *C02F 2209/44* (2013.01); *C02F 2301/043* (2013.01); *C02F 2301/046* (2013.01); *C02F 2303/04* (2013.01); *C02F 2303/185* (2013.01); *E04H 4/1281* (2013.01)

(56) References Cited

U.S. PATENT DOCUMENTS

| | | | | |
|---|---|---|---|---|
| 5,670,451 | A | 9/1997 | Jones et al. | 504/134 |
| 2002/0152036 | A1* | 10/2002 | Martin | 702/22 |
| 2003/0172450 | A1 | 9/2003 | Mock, Sr. et al. | 4/496 |
| 2004/0118787 | A1 | 6/2004 | Bonelli et al. | 210/764 |
| 2010/0313964 | A1* | 12/2010 | Hin et al. | 137/15.01 |
| 2013/0098844 | A1* | 4/2013 | Forstmeier et al. | 210/739 |

OTHER PUBLICATIONS

Rubin, Alan J., *Chemistry of Water Supply, Treatment, and Distribution*, Book chapter, Ann Arbor Science Publishers, Inc., Chapter 14, O'brien, J.E. et al., "Equilibria in Aqueous Solutions of Chlorinated Isocyanurate," 28 pages, 1974.

Downes, C.J. et al., "Determination of Cyanuric Acid Levels in Swimming Pool Waters by u.v. Absorbance, HPLC and Melamine Cyanurate Precipitation," Water Research, vol. 18, No. 3, 4 pages, May 1982.

Golaszewski, G. et al., "The Kinetics of the Action of Chloroisocyanurates on Three Bacteria: *Pseudomonas aeruginosa, Streptococcus faecalis* and *Staphylococcus aureus*," Water Research, vol. 28, No. 1, 11 pages, Apr. 1993.

Tachikawa, M. et al., "Effects of Isocyanuric Acid on the Monochlorodimedone Chlorinating Rates with Free Chlorine and Ammonia Chloramine in Water," Water Research, vol. 36, Elsevier Science Ltd., 8 pages, Oct. 17, 2001.

Wallace & Tiernan(R), "Mess- Und Regelsysteme DEPOLOX 5 Sensor-Messmodul fur MFC und SFC," Siemens Water Technologies Corporation, Product Information, 5 pages (German w/ English translation), 2008.

Wallace & Tiernan(R), "Mess- Und Regelsysteme FC1 Membransensor zur Messung von Freiem Chlor," Siemens Water Technologies Corporation, Product Information, 5 pages (German w/ English translation), 2008.

Wallace & Tiernan(R), "Mess- Und Regelsysteme Gesamtchlor-Sensor-Messmodul für MFC und SFC," Siemens Water Technologies Corporation, Product Information, 5 pages (German w/ English translation), 2008.

Wallace & Tiernan(R), "Wasseraufbereitungs- und Desinfektionssysteme," Siemens Water Technologies Corporation, 34 pages (German w/ English translation), 2010.

European Search Report, Application No. 11191164.0, 7 pages, Mar. 6, 2012.

* cited by examiner

METHOD AND ARRANGEMENT FOR A WATER TREATMENT

CROSS-REFERENCE TO RELATED APPLICATIONS

This application claims priority to EP Patent Application No. 11191164.0 filed Nov. 29, 2011. The contents of which is incorporated herein by reference in its entirety.

TECHNICAL FIELD

The present disclosure relates to water treatment by chlorine disinfection.

BACKGROUND

Common disinfection methods for water, for example swimming pool water, include a dosing of a disinfectant, commonly a chlorine disinfectant, into the water.

Conventionally the chlorine disinfectant is added to water, e.g. swimming pool water, as chlorine gas, sodium- or calcium-hypochlorite while these reactants dissolve in the water to free chlorine species (free chlorine), mainly hypochloric acid (HOCl) and a hypochlorite ion (OCl$^-$) at pH dependent ratios.

Chlorine disinfectants are commonly accepted to be a easy to handle and economic disinfection solutions in water treatment.

While inactivating pathogen microorganisms, the chlorine disinfectants can react with other constitutes of a water matrix in pools and in this way organic and inorganic disinfection by products (DBPs) are formed. DBPs are mainly generated due to the reaction of chlorine with impurities mainly introduced by swimmers but as well due to chlorine decay over time or/and in the presence of UV irradiance.

DBPs have negative health impacts for water consumers or swimmers being exposed to these DBPs, e.g. irritating eyes and respiration of swimmers.

Organic DBPs in pools include chloramines (mono-, di- and tri-chlorinated), referred to as combined chlorine, and trihalomethanes (THMs), maily chloroforms. THMs occur due to a reaction of organic water constitutes, e.g. citric acid introduced by bathers, in contact with chlorine. Their level depends on the THM-formation potential of the organic substances in the water, chlorine concentration, pH, temperature and exposure time.

Main inorganic DBPs are chlorite (ClO2-) and chlorate (ClO3-) being decay-products of free chlorine while their concentration depends on an organic load of a disinfected water, temperature, exposure time, chlorine concentration, chlorine storage time before use and UV irradiance.

As DBPs have said negative health impacts for water consumers or swimmers a reduction of the DBPS by a water treatment will be vital for a high water quality.

The DBP combined chlorine is often reduced photolytically by UV light. In outdoor pools sunlight most often reduces combined chlorine under restricted levels and in indoor pools artificial UV light is used most often in the form of low or medium pressure UV devices.

The inorganic DBP chlorite could also be eliminated by UV, but chlorate not.

Combined chlorine and THMs can be reduced by their adsorption on activated carbon. Inorganic by products do not adsorb on this solid and therefore their concentration accumulates over time. Besides this treatment has a high cost.

Filtration by reverse osmosis (RO) allows the reduction of all resumed water pollutants, producing deionized water. This water needs to be post treated with salt solutions to obtain the required properties for its use in swimming pools. The total costs of RO treatment are too high for most public pools.

It is further known that chlorine disinfectants are very instable to UV irradiation—being degraded by said UV irradiation (photolytic chlorine degradation) (Mariko Tachikawa et al. "Effects of Isocyanuric Acid on the Monochlorodimedone Chlorinating rates with Free Chlorine and Ammonia Chloramine in Water", Water Research, 36 (2002), pp. 2547-2554; J. Gardiner, "Choloisocyanurates in the Treatment of Swimming Pool Water", Water Research Pergamon Press 1973, Vol. 7, pp. 823-833).

Especially during "open" water chlorine disinfection, particularly outdoor swimming pool water chlorine disinfection, said chlorine disinfectant dosed/contained in said "open" water, i.e. said outdoor swimming pool water, will strongly be degraded by sunlight (photolytic chlorine degradation).

An effect of photolytic chlorine degradation will increase for regions of high solar irradiance, for example southern European countries, but can also be relevant and/or significant—on sunny days—in other regions, such as northern European countries.

Photolytic chlorine degradation by water chlorine disinfection can be balanced by an increased chlorine disinfectant dosing, to maintain same, i.e. consistent effective, chlorine disinfectant concentration in said water to disinfect.

This effort will increase process costs while being unsatisfying for an operator/customer. Besides, the DBPs increase, i.e. accumulate, due to increased chlorine consumption.

Another option can be using stabilized chlorine (stabilized chlorine disinfectant) as a chlorine disinfectant with a stabilizing compound (chlorine stabilizer) stabilizing said chlorine disinfectant, i.e. improving an UV stability of said chlorine disinfectant.

The most successful of this stabilizing compound in use at present is isocyanuric acid (ICA), which forms reversibly 1-3-chlorinated chloroisocyanurates with the chlorine disinfectant in aqueous solution, i.e. in said water, and stabilizing said chlorine disinfectant (Mariko Tachikawa et al. "Effects of Isocyanuric Acid on the Monochlorodimedone Chlorinating rates with Free Chlorine and Ammonia Chloramine in Water", Water Research, 36 (2002), pp. 2547-2554; J. Gardiner, "Choloisocyanurates in the Treatment of Swimming Pool Water", Water Research Pergamon Press 1973, Vol. 7, pp. 823-833; C. J. Downes et al., "Determination of Cyanuric Acid Levels in Swimming Pool Waters By u.v. Absorbance, HPLC and Melamine Cyanurate Precipitation", Water Research Vol. 18, No. 3, pp. 277-280, 1984).

This stabilized chlorine disinfection of the (swimming pool) water can be conveniently carried out with chlorinated isocyanuric acid, for example solid chloroisocyanurate (tablets), usually a sodium or potassium salt of a dichloro-compound, while said chlorinated isocyanurate species forming mono-, di- and tri-chlorinated species in the presence of said chlorine disinfectant dissolved in water, i.e. of free chlorine (J. Gardiner, "Choloisocyanurates in the Treatment of Swimming Pool Water", Water Research Pergamon Press 1973, Vol. 7, pp. 823-833; C. J. Downes et al., "Determination of Cyanuric Acid Levels in Swimming Pool Waters By u.v. Absorbance, HPLC and Melamine Cyanurate Precipitation", Water Research Vol. 18, No. 3, pp. 277-280, 1984).

An inconvenience for the use of chlorinated isocyanuric acid instead of non-stabilized chlorine disinfection by free chlorine is the decrease in disinfection safety at increasing isocyanuric acid concentrations (Golaszweski G., Seux R., "The kinetics of the action of chloroisocyanurates on three bacteria: *pseudomonas aeruginosa, streptococcus faecalis* and *staphylococcus aureus*", Wat. Res. 28.1, 207-217, 1994) while said isocyanuric acid also having negative health impacts for water consumers or swimmers being exposed.

The available free chlorine of the chlorinated isocyanuric acid, responsible for disinfection is consumed over time due to the chlorine demand of the swimming pool matrix. As a consequence more chlorinated isocyanuric acid is added to the pool and isocyanuric acid, the solution product of chlorinated isocyanuric acid, accumulates to unsafe concentrations, e.g. up to 140 mg/l and higher.

As it is the case for other applications, pool water disinfection is always fighting to find a best balance between microbiological safety and chemical impact of disinfectants in the water—on human and ecological environment.

Known (concentration) measurement methods for said chlorine disinfectant and said isocyanuric acid are spectrometric methods (DPD, Melanin based CyA-Test).

Equipments for dosing as well as for a controlled dosing of chlorine disinfectant to water to be treated are known as well as equipments for irradiating water with UV, for example Wallace & Tiernan®, "Wasseraufbereitungs—und Desinfektionssysteme", Oktober 2010.

(Online) Sensors measuring chlorine disinfectant concentrations of chlorine disinfectant contained in water are known, for example a membrane sensor FCl (Free Chlorine) or TCl (Total Chlorine) as well as a bare electrode sensor Depolox5 of Wallace & Tiernan (Wallace & Tiernan, Siemens, Water Technologies, Produktinformation zu Membransensor FCl, TCl und zu Depolox5 Sensor).

SUMMARY

In one embodiment, a method for a water treatment by chlorine disinfection comprises: dosing a chlorine stabilizer into water to be treated as far as a predetermined chlorine stabilizer concentration in said water is achieved and maintaining said achieved chlorine stabilizer concentration in said water constant, and adjusting a chlorine disinfectant concentration in said water to be treated to a predetermined chlorine disinfectant concentration in said water by dosing a non-stabilized chlorine disinfectant (free chlorine) into said water to be treated.

In a further embodiment, said chlorine stabilizer is a non-chlorinated or a chlorinated chlorine stabilizer, especially a non-chlorinated or a chlorinated isocyanuric acid, further more especially in its enol or keto tautomeric forms or in its non-chlorinated, mono- di- or/and tri-chlorinated forms, and/or said non-stabilized chlorine disinfectant (free chlorine) is chlorine/chlorine gas, chlorine dioxide, hypochloric acid or hypo chlorite. In a further embodiment, said chlorine stabilizer is a powder or granule, especially being pre-dissolved before its dosing or dosed in its solid form. In a further embodiment, said predetermined chlorine stabilizer concentration is less than about 50 mg/L, especially less than about 20 mg/L, further more especially less than about 5 mg/L or about 3 mg/L-5 mg/L. In a further embodiment, said predetermined chlorine disinfectant concentration is about 0.1 mg/L-5 mg/L, especially about 0.5 mg/L. In a further embodiment, said chlorine stabilizer and/or said non-stabilized chlorine disinfectant (free chlorine) are/is dosed into said water at constant concentrations/a constant concentration and/or wherein said chlorine stabilizer and/or said non-stabilized chlorine disinfectant are/is dosed as a liquid or as a solid or as a powder, especially said powder being pre-dissolved before dosing. In a further embodiment, a chlorine stabilizer concentration, especially an isocyanuric acid concentration, is measured directly via a standard cyanuric acid test or measured, especially measured online, indirectly via an analysis of free chlorine degradation by UV photolysis, and/or wherein said chlorine disinfectant concentration is measured, especially measured online, via an online chlorine membrane sensor.

In another embodiment, an arrangement for a water treatment by chlorine disinfection comprises: a flow pass of water to be treated flowing at said flow pass, a first dosing means arranged at said flow pass for dosing a chlorine stabilizer into said water to be treated, a second dosing means arranged at said flow pass for dosing a non-stabilized chlorine disinfectant into said water to be treated, a first measuring means arranged at said flow pass for measuring a chlorine stabilizer concentration in said water, a second measuring means arranged at said flow pass for measuring a chlorine disinfectant concentration in said water, and a controlling means for controlling said first and second dosing means and said first and second measuring means for: dosing said chlorine stabilizer into said water to be treated as far as a predetermined chlorine stabilizer concentration in said water is achieved and maintaining said achieved chlorine stabilizer concentration in said water constant, and adjusting said chlorine disinfectant concentration in said water to be treated to a predetermined chlorine disinfectant concentration in said water by dosing said non-stabilized chlorine disinfectant into said water to be treated.

In a further embodiment, the arrangement further comprises an UV source arrangement for irradiating said water with an UV irradiation, especially said UV source arrangement arranged at said flow pass used for an UV dechloramination or arranged at a by pass to said flow pass used for said chlorine stabilizer concentration measurement via an analysis of free chlorine degradation by UV photolysis.

In another embodiment, an arrangement for a water treatment as discussed above is used for an online controlling of said water to be treated and/or for controlling a water quality of said water to be treated, e.g., swimming pool water, further more especially indoor or outdoor swimming pool water.

BRIEF DESCRIPTION OF THE DRAWINGS

Example embodiments will be explained in more detail below with reference to figures, in which.

DETAILED DESCRIPTION

Figure 1:
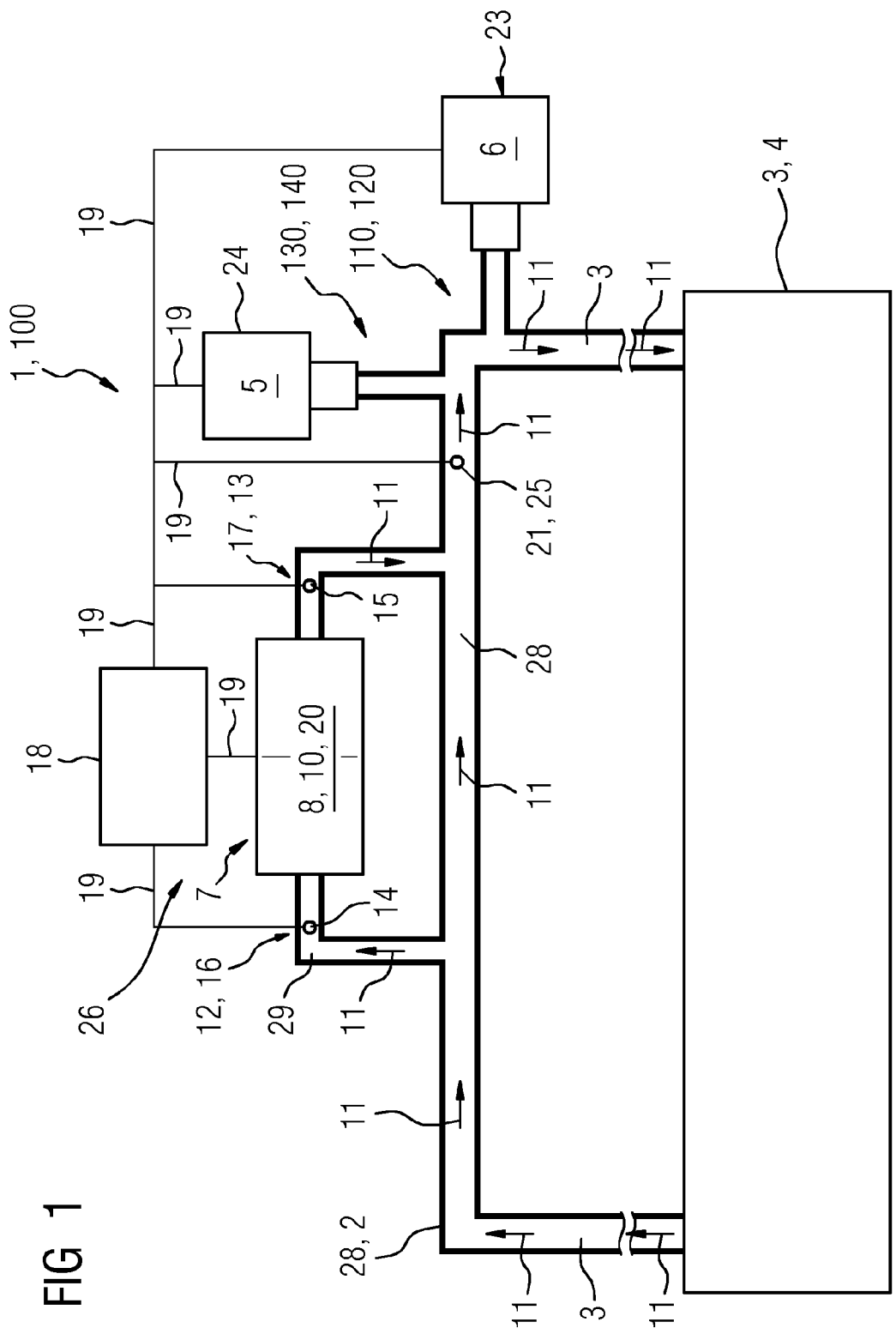
FIG. 1 is a schematic illustration of a water treatment arrangement/system with an indirect chlorine stabilizer concentration measurement according to one embodiment (water treatment for outdoor pools)

Embodiments disclosed herein provide a method and an arrangement for a water treatment by chlorine disinfection by which the above-mentioned shortcomings in water treatment can be mitigated and water quality of water to be treated can be improved without compromising safety.

Other embodiments provide a method and an arrangement for water treatment which facilitate effective and efficient water disinfection without compromising disinfection safety.

In some embodiments, the method comprises a chlorine stabilizer, especially a non-chlorinated or a chlorinated chlorine stabilizer, being dosed into water to be treated as far as a predetermined chlorine stabilizer concentration in said water is achieved.

As soon as said predetermined chlorine stabilizer concentration is achieved said predetermined, i.e., said achieved, chlorine stabilizer concentration is maintained in said water constant.

Non-chlorinated chlorine stabilizer means a chlorine stabilizer, stabilizing a chlorine disinfectant, i.e. improving a UV stability of a chlorine disinfectant, being free of a chlorine species component, e.g. isocyanuric acid, while chlorinated chlorine stabilizer means a chlorine stabilizer comprising a chlorine species component, e.g. chlorinated isocyanuric acid or chloroisocyanurate. Especially said non-chlorinated or chlorinated isocyanuric acid can be in its enol or keto tautomeric form or in its non-chlorinated, mono- di- or/and trichlorinated form.

A chlorine disinfectant concentration is adjusted in said water to be treated to a predetermined chlorine disinfectant concentration in said water by dosing a non-stabilized chlorine disinfectant (free chlorine) into said water to be treated.

Non-stabilized chlorine disinfectant means a chlorine disinfectant being free of a chlorine stabilizer component (free chlorine), i.e. said chlorine stabilizer component improving a UV stability of a chlorine disinfectant, e.g. chlorine gas, sodium- or calcium-hypochlorite.

Therefore, while adjusting said chlorine disinfectant concentration by dosing said free chlorine without said chlorine stabilizer—as soon as the predetermined chlorine stabilizer concentration is achieved and while said achieved chlorine stabilizer concentration is maintained—, said chlorine stabilizer concentration can be kept constant at a low level, i.e. harmless level, and no chlorine stabilizer accumulation, e.g. no isocyanuric acid accumulation, does occur.

In other words, only an amount of free chlorine consumed over time in water, e.g. pool water, is replaced by the addition of the free chlorine, without said chlorine stabilizer.

In this way said chlorine stabilizer concentration can be kept at a low level, i.e. harmless level, and no chlorine stabilizer accumulation, e.g. no isocyanuric acid accumulation, does occur.

A free chlorine level can be kept constant by a controlled addition of free chlorine separately from the chlorine stabilizer.

Said arrangement comprises a flow pass of water to be treated, said water to be treated flowing at said flow pass. As well as a by pass to said flow pass could be provided—also flown by said water to be treated. Both, i.e. said flow pass as well as said by pass, would be understood as said flow pass of water to be treated since said flow pass as well as said by pass are flown by said water to be treated.

A first dosing means is arranged at said flow pass for dosing a chlorine stabilizer, especially a non-chlorinated or chlorinated chlorine stabilizer, into said water to be treated. A second dosing means is arranged at said flow pass for dosing a non-stabilized chlorine disinfectant (free chlorine) into said water to be treated.

A first measuring means is arranged at said flow pass for measuring a chlorine stabilizer concentration in said water. A second measuring means is arranged at said flow pass for measuring a chlorine disinfectant concentration in said water.

Said arrangement further comprises a controlling means for controlling said first and second dosing means and said first and second measuring means for dosing said chlorine stabilizer into said water to be treated as far as a predetermined chlorine stabilizer concentration in said water is achieved and maintaining said achieved chlorine stabilizer concentration in said water constant.

Said controlling means also controls adjusting said chlorine disinfectant concentration in said water to be treated to a predetermined chlorine disinfectant concentration in said water by dosing said non-stabilized chlorine disinfectant (free chlorine) into said water to be treated.

Therefore, the disclosed methods and arrangements combine a constant chlorine stabilizer concentration—being/maintained constant—once achieved—on a predetermined/predefined harmless level—with/while a non-stabilized chlorine disinfectant dosing, i.e., free chlorine dosing.

These (two) principles combine an advantage of a low chlorine consumption and a low DBPs generation—with a high disinfection safety at a low/harmless (non-accumulating) chlorine stabilizer.

In other words—the disclosed methods and arrangements introduce a chlorine stabilizer, e.g. non-chlorinated or chlorinated isocyanuric acid, into water (dosing the chlorine stabilizer), for example by dosing a respective liquid, solid or powder.

As soon as a required/predetermined chlorine stabilizer concentration is achieved, no further chlorine stabilizer is added—until the concentration decreases again, by e.g. dilution due to freshwater addition (maintaining the required/predetermined chlorine stabilizer concentration).

As soon as a free chlorine concentration diverts from a desired/predetermined free chlorine concentration in the water, especially decreases, e.g. by a chlorine consumption, the free chlorine concentration will be adjusted, e.g. increased, —up to the desired/predetermined free chlorine concentration—by (merely) dosing a non-stabilized chlorine disinfectant, i.e. free chlorine, into the water (adjusting the chlorine disinfectant concentration to the predetermined chlorine disinfectant concentration)—instead of dosing a stabilized chlorine disinfectant, e.g. chlorinated isocyanuric acid.

"The free chlorine concentration diverting from the desired/predetermined free chlorine concentration" can mean that an actual free chlorine concentration deviates from the desired/predetermined concentration—for example because of said water not being chlorine disinfected or said water being less chlorine disinfected as well as said—once at the desired/predetermined concentration adjusted—free chlorine concentration has changed—for example because of free chlorine is consumed over time due to the presence of contaminants, UV irradiance or decay.

The free chlorine concentration will be maintained constant at said predetermined chlorine disinfectant concentration, i.e has to be adjusted to said predetermined chlorine disinfectant concentration, by dosing and control systems, to guarantee disinfection safety.

In this way the non-stabilized chlorine disinfectant, e.g. the free chlorine, can be replenished without increasing the chlorine stabilizer concentration, e.g. the isocyanuric acid concentration, —and the chlorine stabilizer concentration, e.g. the chlorinated or non-chlorinated isocyanuric acid concentration, remains constant at an optimum, harmless level.

Therefore a negative effect of chlorine stabilizer accumulation, e.g. chlorinated or non-chlorinated isocyanuric acid accumulation, in the pool water—when a chlorine stabilizer, e.g. chlorinated or non-chlorinated ICA, is used—is eliminated.

Experiments have shown that already with (constant) low isocyanuric acid concentrations of about less than 50 mg/L, especially about less than 20 mg/L, further more especially about 5-10 mg/L, most preferable of about 5 mg/L, a significant reduction of a total consumption of free chlorine is achieved (with the chlorine disinfectant stabilized sufficiently)—without compromising disinfection safety. As well as an optimum DBPs reduction, i.e. the total concentration of combined chlorine, THMs, chlorate and chlorite generated were reduced significantly at the same time, will be allowed without compromising disinfection safety.

Therefore, the disclosed methods and arrangements combine advantages of free chlorine and stabilized chlorine disinfection while facilitating a reduction of DBPs as well as a reduction of the total chlorine consumption at low chlorine stabilizer concentrations in water without compromising disinfection safety.

Particularly, a separate dosing of free chlorine—as the non-stabilized chlorine disinfectant—and isocyanuric acid—as the chlorine stabilizer—allows keeping the isocyanuric acid concentrations at an optimum (low) level and constant. This process can be achieved by respective analyzer, dosing and control devices.

Particularly in outdoor pools, the disclosed methods and arrangements can provide an effective and cost-efficient treatment process as a total chlorine consumption is—outdoor—very high due to the solar UV irradiance and the photolytic decay of free chlorine. The main DBPs generated while outdoor pool water chlorine disinfection are THMs and chlorate, while both are expected to be drastically reduced by the disclosed treatment process as well as combined chlorine is generally reduced at the same time photolytically.

Particularly in indoor pools, a combination of UV devices—facilitating an UV dechloramination—and isocyanuric acid at relatively low isocyanuric acid concentrations allows reducing combined chlorine and THMs, chlorate and chlorite, total chlorine consumption at the same time, increasing overall disinfection safety.

Hence, the disclosed methods and arrangements may provide a new, effective approach for efficient water treatment/disinfection, particularly for an online controlled pool water treatment, reaching a targeted water quality at a very economic, ecological and practical way without compromising disinfection safety.

According to one embodiment said non-stabilized chlorine disinfectant (free chlorine) is chlorine/chlorine gas (Cl2), chlorine dioxide (ClO2) hypochloric acid (HOCl) or hypo chlorite (OCl—) as long as these non-stabilized chlorine disinfectants are most successful in use at present.

According to a further preferred embodiment said chlorine stabilizer can be a chlorinated or non-chlorinated chlorine stabilizer. Said chlorinated chlorine stabilizer—comprising a chlorine species component—can be chlorinated isocyanuric acid; said non-chlorinated chlorine stabilizer—being free of a chlorine species component—can isocyanic acid, especially in its enol or keto tantomeric form. But as well other cyanuric or other species and similar chemicals comprising/free of a chlorine component improving said UV stability of the chlorine disinfectant could be used.

Said chlorine stabilizer could be liquid or solid—or it could be a powder, especially said powder being pre-dissolved before its dosing. As well as said chlorine disinfectant can be dosed as a liquid or as a solid or as a powder, especially said powder being pre-dissolved before dosing.

According to a preferred embodiment said non-chlorinated chlorine stabilizer dosed is isocyanuric acid (ICA) or said chlorinated chlorine stabilizer dosed is chlorinated isocyanuric acid (ICA), especially being received as granules and pre-dissolved in water.

According to a further preferred embodiment said predetermined chlorine stabilizer concentration is a isocyanuric acid concentration less than about 50 mg/L, especially less than about 20 mg/L, further more especially less than about 10 mg/L or about 5 mg/L-1-5 mg/L, since a—constant—isocyanuric acid concentration in the range of 3 mg/L-50 mg/L allows the optimum DBP reduction without compromising disinfection safety.

According to a further preferred embodiment said predetermined chlorine disinfectant concentration is about 0.1 mg/L-5 mg/L, especially about 0.5 mg/L.

According to a further preferred embodiment said chlorine stabilizer can be dosed into said water at a constant concentration. As well as said non-stabilized chlorine disinfectant can be dosed into said water at a constant concentration.

Respective dosing equipments for a—especially controlled—dosing of liquid, solid or powder into a fluid are well known and highly proved. As well as dosing said chlorine stabilizer at a constant chlorine stabilizer concentration uncontrolled combined with other fluids, for example fresh water, is possible.

According to a further preferred embodiment the chlorine stabilizer concentration, especially a isocyanuric acid concentration, in the water is measured via a standard cyanuric acid test (direct measurement).

According to another preferred embodiment the chlorine stabilizer concentration, especially an isocyanuric acid concentration, in the water is measured, especially measured online, (indirectly) via an analysis of free chlorine degradation by UV photolysis.

In other words—this—indirectly—measurement of the chlorine stabilizer concentration relates to a measurement/determination of said chlorine stabilizer with a measurement principle based on the photolytic chlorine degradation.

Therefore, the chlorine disinfectant concentration could be measured in front of/before (initial chlorine concentration) and past/after (remaining chlorine concentration) an UV source irradiating the water—leading to a Δ in the non-stabilized chlorine concentration (Δchlorine).

The degradation of said non-stabilized chlorine disinfectant correlates, for example is proportional, to said chlorine stabilizer concentration, as for example said isocyanuric acid concentration.

Experiments have shown that a decrease in photolytic chlorine degradation—resulting in a decreased Δchlorine—is close proportional to an increase in said chlorine stabilizer concentration.

The exact dependence is influenced by an interaction between the chlorine stabilizer and free chlorine, which is pH, concentration and temperature dependent. This dependence is closer described in Rubin, 1974, J. A. 1974. Chemistry of Water Supply Treatment and Distribution, Ann Arbor Science Publishers, Inc. P.O. Box 1425, Ann Arbor, Mich., Chapter 14 at O'Brien, J. E. Morris, J. C., Butler, J. N. Equilibria in aqueous solutions of chlorinated isocyanurate ISBN 0-250-40036-7, P. 333-341.

In other words—an increased concentration of said chlorine stabilizer contained in said water could be seen by decreased photolytic chlorine degradation, i.e. Δchlorine measured.

An exact UV/chlorine stabilizer dose response curve, for example an UV/isocyanuric acid dose response curve, can be determined experimentally—and then used for determining said chlorine stabilizer concentration using said (measured) initial chlorine concentration and said (measured) remaining chlorine concentration, i.e. using said Δchlorine measured. It can as well be modelled similar to existing models of the isocyanuric acid and free chlorine interaction described e.g. by Rubin (Rubin 1974)

Hence, the concentration of said chlorine stabilizer is determined based on the change in free chlorine photolysis—easily measured by (online) chlorine sensors providing said chlorine stabilizer being online measured.

According to a preferred embodiment, especially operating with said indirect measurement of the chlorine stabilizer concentration, an UV source arrangement can be arranged at a by pass to said flow pass for irradiating said water with an UV irradiation.

As well as operating an UV dechloramination, especially for indoor water treatment, an UV source arrangement can be arranged at said flow pass.

Further more, said UV source arrangement can comprise one or more tubular low pressure UV lamps, especially operating in a range of 20 Watt-100 Watt and/or with an irradiation dose of about 200 J/m$^2$-4000 J/m$^2$. Furthermore UV irradiation of said UV source arrangement could have a wavelength of about 100 nm-400 nm, especially having a wavelength of about 200 nm-400 nm, furthermore especially of about 240 nm-300 nm.

Said UV source arrangement can have any shape and/or size, preferable hollowly coaxial or of cylindrical shape with the one or more UV source/sources inside and being flowed through by said water.

In a preferred embodiment said UV source arrangement comprises a poly-chromatic irradiator/medium pressure UV source. Medium pressure UV sources/lamps provide an expanded wavelength spectrum and could be constructed more compact.

Said UV source arrangement could also be a mono-chromatic irradiator/low pressure UV source, for example a low pressure amalgam UV lamp or a low pressure mercury UV lamp. Low pressure UV lamps are highly efficient while providing a small spectrum by a wavelength of about 257.3 nm, less energy input combined with less costs.

As well solar irradiance can be used as an UV source as well as excimer lights or UV-LEDs or even light sources emitting below a UV spectrum in visible light range (with lower photolysis yields).

A flow rate of said water—while being measured—and/or a reaction time, i.e. an irradiation time, could be kept constant as the photolytic chlorine degradation would depend on the irradiation (W) and the reaction time (T), i.e. on the dose (D) or fluence (F). It could—while not being kept constant—as well be measured and integrated as parameter into the overall measurement.

According to a further preferred embodiment said chlorine disinfectant concentration is measured, especially measured online, via an online chlorine (membrane) sensor. These (online) sensors measuring chlorine disinfectant concentrations of chlorine disinfectant contained in water are well known, for example a membrane sensor FCl (Free Chlorine) or TCl (Total Chlorine) as well as a bare electrode sensor Depolox5 of Wallace & Tiernan (Wallace & Tiernan, Siemens, Water Technologies, Produktinformation zu Membransensor FCl, TCl and zu Depolox5 Sensor) and highly proved.

But as well a sensor/sensors for total chlorine or combined chlorine species or similar devices/means could provide an adequate chlorine signal being used for determining said non-stabilized chlorine stabilizer concentration.

According to another preferred embodiment an acid and/or a base is dosed into said water, especially (HCl), (H2SO4) and/or (NaOH), to adjust a pH value of said water at a predefined level, particularly at about pH 7.

According to a further preferred embodiment said controlling means is an adaptive controlling means, especially being adaptive based on time-based learning.

Sensor/measurement means signals and/or sensor/measurement means data according to said measured concentration(-s) could be processed online by said controlling means, for example a processing unit provided with measurement/controlling software, facilitating said water treatment.

Said water treatment controlling could also include controlling said irradiating/UV irradiation source as well as controlling said flow rate of said water to be treated/disinfected.

According to a preferred embodiment said water to be disinfected flows at a flow rate typically for respective water treatment controlling measurement systems, for example at a flow rate of 1 L/h-50 L/h, especially at a, especially constant, flow rate of about 5 L/h-35 L/h. The flow rate can be controlled/monitored by use of a flow control.

According to a preferred embodiment said water to be disinfected could be swimming pool water, especially indoor or outdoor swimming pool water. But nevertheless said method and arrangement could be used for any disinfection application that need UV stabilization of said chlorine disinfectant, particularly whose free chlorine.

Said method and/or arrangement for said water treatment control could be applied to said water while said water flows in a main water circulation comprising said flow pass, for example a swimming pool water circulation.

Especially using said UV source arrangement facilitating said indirect chlorine stabilizer concentration measurement said UV source arrangement including said respecting measurement devices could be arranged in a by pass to said flow pass, i.e said main water circulation. As well as using said UV source arrangement facilitating said UV dechloramination said UV source arrangement could be arranged at said flow pass, i.e said main water circulation.

According to another further embodiment a water quality of said water to be treated will be controlled by treating the water with the disclosed water treatment by chlorine disinfection.

Figure 2:
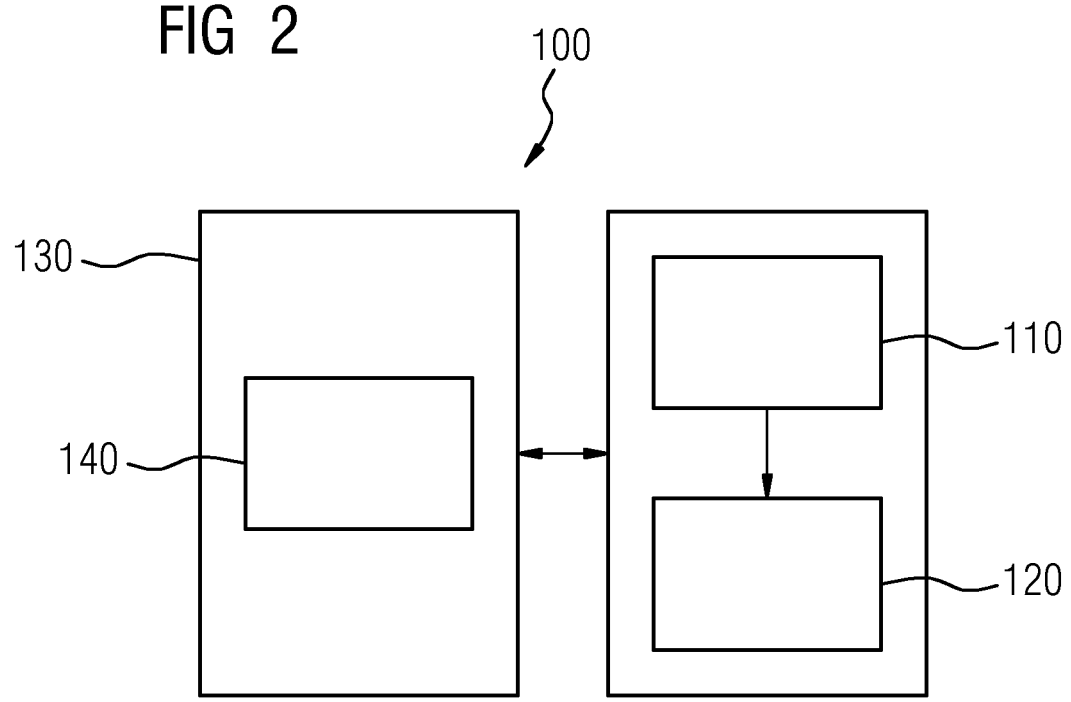
FIG. 2 is a schematic illustration of a water treatment method by chlorine disinfection according to one embodiment.

Example embodiments are now described for a water treatment by chlorine disinfection 1, 100 for outdoor (swimming) pools 4 (FIG. 1) as well as for indoor (swimming) pools 4 (FIG. 3), —both—based—as schematically illustrated in FIG. 2—on a dosing 110, 120 of a non-chlorinated chlorine stabilizer 6, 23, i.e. of non-chlorinated Isocyanuric Acid (ICA) 6, together with a dosing 130, 140 of a non-stabilized chlorine disinfectant (free chlorine) 5, 24, i.e. sodium hypochlorite 5 being diluted before dosing.

The described water treatment method/arrangement 1,100 couples this pool water treatment process by chlorine disinfection 100—combining a low constant ICA concentrations (5 mg/L) with the free chlorine dosing 24—with an online, indirect measurement method for the ICA concentration in the pool water 3 based on analysis of free chlorine degradation by LP UV photolysis 8 (photolytic chlorine degradation 8).

Identical figure elements are referred by identical numbers.

Figure 3:
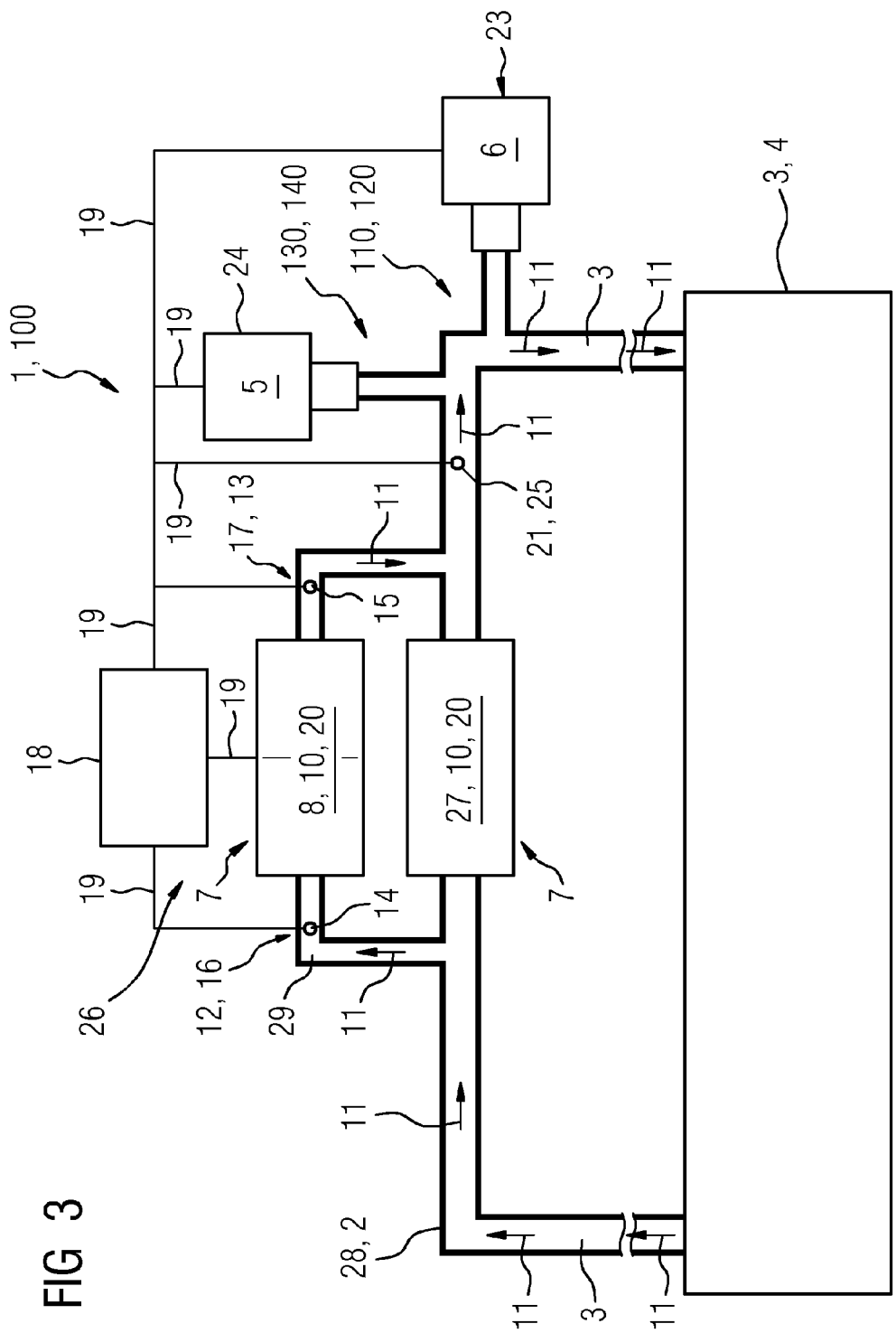
FIG. 3 is a schematic illustration of a water treatment system/arrangement with an UV dechloramination according to one embodiment (water treatment for indoor pools).

The water treatment 1, 100 (FIG. 1, FIG. 2, FIG. 3) will be used for disinfecting the swimming pool water 3 while—as shown in FIGS. 1 and 3—the swimming pool water to be disinfected circulates—in a flow direction 11—in a main circulation system 28, i.e. a flow pass 2, of said swimming pool 4 as well as in by pass 29 to said flow pass 2, i.e. to said main circulation system 28.

The swimming pool water 3, only referred as water 3, to be disinfected by the sodium hypochlorite 5, contains hazardous contaminants, especially residuals of pesticides, pharmaceuticals, drugs, hormones, personal care products—which can be eliminated by the water chlorine disinfection, i.e. by said sodium hypochlorite 5.

The arrangements 1 shown in FIGS. 1 and 3 perform the online, indirect measurement of the ICA concentration (measuring means 26) in said by pass 29—based on the analysis of the free chlorine degradation/photolytic chlorine degradation 8—via the detection of free chlorine before 16 (initial free chlorine concentration 12) and after 17 (remaining free chlorine concentration 13) a UV source 10 to simulate UV photolysis by UV irradiation 7 (measuring means/arrangement 26).

The UV source 10, i.e. a UV LP device 10, was equipped with a low pressure (LP) amalgam lamp 20 with lamp power 40 W, being controlled via an analyzer and controller system 18 connected with the UV source 10 by circuits 19.

The photolytic chlorine degradation 8 depends, belong other parameters, the (defined) irradiance 7 of the UV source/lamp 20 as well as the ICA 6 in the water 3 while knowledge of said photolytic chlorine degradation 8 measured allows processing and monitoring the ICA concentration.

The photolytic degradation 8 of said free chlorine 5 is measured as a change in concentrations (Δchlorine=initial free chlorine concentration 12-remaining free chlorine concentration 13) with being first order decay to the ICA 6 concentration.

While knowing the UV irradiating parameters of the UV irradiation 7, as the dose, reaction time and fluence, as well as the flow rate of the water 3 and the UV/ICA dose response curve which has be determined experimentally preliminary the ICA 6 can be processed and monitored based on the change in the free chlorine concentrations.

The online measuring of the free chlorine is performed with chlorine specific membrane sensors FCl 4, 15 (Wallace & Tiernan, Siemens, Water Technologies, Produktinformation zu Membransensor FCl), while the online determination of the ICA concentration is performed and controlled via the analyzer and controller system 18—connected with the sensors 14, 15 also by circuits 19.

The free chlorine dosing 24, 130, 140 and the ICA dosing 23, 110, 120 are performed with dosing apparatus 24, 23 comprising controlled dosing pumps and are controlled via the analyzer and controller system 18 connected with the dosing apparatus 24, 23 by circuits 19.

The water 3 is recirculated by a centrifugal pump (not shown) through the main circulation system 28, i.e. the flow pass 2, and the by pass 29 while a flow rate of the water 3 is adjusted and kept constantly at 430 mL/h.

Based on the online measuring of the free chlorine concentration (measuring means 25, 21)—facilitated by a chlorine specific membrane sensor FCl 21 (Wallace & Tiernan, Siemens, Water Technologies, Produktinformation zu Membransensor FCl) at said flow pass 2 upstream said dosing means 23, 24 as well as the ICA concentration (measuring means 26, 14, 15, 18) the water treatment by chlorine disinfection 1, 100 will be executed by controlling the dosing of the free chlorine 5 (130, 140) (dosing means 24) and the ICA 6 (110, 120) (dosing means 23) to the water 3—therefore controlling water disinfection and water quality.

The free chlorine concentration is adjusted to 0.5 mg/L (as it is measured by the chlorine sensor 15) as well as the ICA concentration is adjusted (as it is indirectly measured by the chlorine sensors 14, 15) to 5 mg/L according the water treatment method by chlorine disinfection 100—as further illustrated in FIG. 2.

FIG. 2 illustrates the basic principles of the method for the water treatment by chlorine disinfection 100 as it will be processed by the arrangements 1 shown in FIG. 1—and FIG. 3.

The processing, i.e. the method 100, will be controlled and performed online by the analyser and controller system 18—via the sensor and dosing means 21, 23-26 measuring the concentrations of the chemicals used, i.e. the sodium hypochlorite 5 and IC 6, and dosing these chemicals used into the water 3 respectively.

The ICA 6 is dosed into the water 3 as far as a required non-chlorinated ICA concentration, i.e. 5 mg/L, in the water 3 is achieved 110.

As soon as the required non-chlorinated ICA concentration is achieved, no further non-chlorinated ICA is added—until the non-chlorinated ICA concentration decreases again 120, by e.g. dilution due to freshwater addition.

As soon as the free chlorine concentration—while said non-chlorinated ICA concentration has achieved its level and will be maintained at this level—diverts from the desired free chlorine concentration, i.e. 0.5 mg/L, in the water 3, e.g. by a chlorine consumption, the free chlorine concentration will be adjusted 130 to the required free chlorine concentration—by dosing 140 the free chlorine into the water 3.

In this way the free chlorine 5 can be replenished without increasing the non-chlorinated ICA concentration—and the non-chlorinated ICA concentration remains constant at an optimum, harmless level.

Therefore a negative effect of non-chlorinated chlorine stabilizer accumulation, e.g. ICA accumulation, in the pool water 3—when a chlorinated chlorine stabilizer, e.g. chlorinated ICA, is used—is eliminated.

FIG. 3 shows the water treatment arrangement 1 of FIG. 1 configured for indoor pools 4.

In indoor pools 4, the combined dosing of non-chlorinated ICA 6 together with free chlorine 5 can be combined with a conventional UV dechloramination treatment 27 reducing the residual combined chlorine.

The UV dechloramination 27 is performed with low or medium pressure UV devices 10 arranged at the flow pass 2 upstream the dosing devices 23, 24 for the combined dosing of non-chlorinated ICA 6 together with free chlorine 5 being flown through 11 by the water 3.

The degradation of the combined chlorine by UV 27 is not inhibited by ICA 6.

As an—not shown—alternative of the water treatment arrangement 1 for indoor pools 4 the conventional UV dechloramination treatment 27 can also be performed by the UV source 10 performing the photolytic chlorine degradation 8 for the ICA concentration measurement.

The method 100 and the arrangements 1—as illustrated in the FIGS. 1, 2 and 3—combine the advantages of free chlorine and stabilized chlorine disinfection while facilitating a reduction of DBPs as well as a reduction of the total chlorine consumption at low chlorine stabilizer concentrations in water without compromising disinfection safety.

REFERENCE LIST

1 arrangement for a water treatment by chlorine disinfection
2 flow pass
3 water to be treated, (indoor/outdoor) swimming pool water
4 (indoor/outdoor) swimming pool
5 free chlorine, sodium hypochlorite, free chlorine
6 chlorine stabilizer, isocyanuric acid (ICA)
7 UV irradiation
8 photolytic chlorine degradation 10 UV source
11 flow direction
12 initial chlorine concentration measurement (section)
13 remaining chlorine concentration measurement (section)
14 first online sensor
15 second online sensor,
16 first measuring point before 10
17 second measuring point after 10
18 controller, analyser and controller system
19 circuit
20 (tubular) low pressure UV lamp
21 third online sensor
23 first dosing means for dosing a chlorine stabilizer
24 second dosing means arranged for dosing a non-stabilized chlorine disinfectant (free chlorine)
25 second measuring means/apparatus for measuring a non-stabilized chlorine disinfectant concentration of a non-stabilized chlorine disinfectant
26 first measuring means/apparatus for measuring a chlorine stabilizer concentration
27 UV dechloramination, chloramine reduction by UV
28 main (pool) water circulation, main circulation system
29 by pass
100 method for a water treatment by chlorine disinfection
110 dosing a chlorine stabilizer into water to be treated as far as a predetermined chlorine stabilizer concentration in said water is achieved
120 maintaining said achieved chlorine stabilizer concentration in said water constant,
130 adjusting a chlorine disinfectant concentration in said water to be treated to a predetermined chlorine disinfectant concentration in said water
140 dosing a non-stabilized chlorine disinfectant into said water to be treated

What is claimed is:

1. A method of disinfecting water, comprising:
    dosing a chlorine stabilizer into the water until a predetermined chlorine stabilizer concentration is achieved;
    monitoring a concentration of the chlorine stabilizer in the water via an analysis of free chlorine degradation by UV photolysis to indirectly determine the chlorine stabilizer concentration in the water;
    controlling the dosing of additional stabilizer based on the indirectly determined chlorine stabilizer concentration in the water thereby maintaining the predetermined chlorine stabilizer concentration in the water; and
    maintaining a chlorine disinfectant concentration in the water at a predetermined chlorine disinfectant concentration by dosing a non-stabilized chlorine disinfectant into the water.

2. The method of claim 1, wherein said chlorine stabilizer comprises a non-chlorinated or a chlorinated chlorine stabilizer.

3. The method of claim 1, wherein said chlorine stabilizer comprises a powder or granule.

4. The method of claim 1, wherein said predetermined chlorine stabilizer concentration is less than about 50 mg/L.

5. The method of claim 1, wherein said predetermined chlorine disinfectant concentration is about 0.1 mg/L to about 5 mg/L.

6. The method of claim 1, wherein at least one of said chlorine stabilizer and said non-stabilized chlorine disinfectant is dosed into said water at a constant concentration in the water.

7. The method of claim 1, wherein said chlorine stabilizer comprises a non-chlorinated or a chlorinated chlorine stabilizer, and said non-stabilized chlorine disinfectant comprises chlorine/chlorine gas, chlorine dioxide, hypochloric acid or hypo chlorite.

8. The method of claim 1, wherein said chlorine stabilizer comprises a powder or granule pre-dissolved before its dosing or dosed in its solid form.

9. The method of claim 1, wherein said predetermined chlorine stabilizer concentration is less than about 20 mg/L.

10. The method of claim 1, wherein said predetermined chlorine stabilizer concentration is about 3 mg/L to about 5 mg/L.

11. The method of claim 1, wherein said predetermined chlorine disinfectant concentration is about 0.5 mg/L.

12. The method of claim 1, wherein at least one of said chlorine stabilizer and said non-stabilized chlorine disinfectant is dosed into said water as a liquid, a solid, or a powder, and dosed into said water at a constant concentration.

13. The method of claim 1, wherein said chlorine disinfectant concentration is measured online.

14. The method of claim 1, wherein a chlorine stabilizer concentration is measured online.

15. The method of claim 1, wherein the method is used for an online controlling of said water to be treated or for controlling a water quality of said water to be treated.

16. The method of claim 1, wherein the method is used for an online controlling of swimming pool water.

* * * * *